US012803348B2

(12) United States Patent
Tang et al.

(10) Patent No.: US 12,803,348 B2
(45) Date of Patent: Nov. 17, 2026

(54) COOLING STRUCTURE FOR DISC-TYPE MOTOR

(71) Applicant: SHANGHAI PANGOOD POWER TECHNOLOGY CO., LTD., Shanghai (CN)

(72) Inventors: Lei Tang, Jinhua (CN); Yixiong Li, Jinhua (CN); Guangquan Zhang, Jinhua (CN); Wenxiong Yang, Jinhua (CN); Li Xia, Jinhua (CN); Jinhua Chen, Jinhua (CN)

(73) Assignee: SHANGHAI PANGOOD POWER TECHNOLOGYCO., LTD., Shanghai (CN)

( * ) Notice: Subject to any disclaimer, the term of this patent is extended or adjusted under 35 U.S.C. 154(b) by 282 days.

(21) Appl. No.: 18/250,729

(22) PCT Filed: Jan. 20, 2021

(86) PCT No.: PCT/CN2021/072814
§ 371 (c)(1),
(2) Date: Apr. 26, 2023

(87) PCT Pub. No.: WO2022/088527
PCT Pub. Date: May 5, 2022

(65) Prior Publication Data

US 2023/0396105 A1 Dec. 7, 2023

(30) Foreign Application Priority Data

Oct. 30, 2020 (CN) ......................... 202011190399.6
Oct. 30, 2020 (CN) ......................... 202011195375.X

(51) Int. Cl.
*H02K 1/20* (2006.01)
*H02K 1/14* (2006.01)
(Continued)

(52) U.S. Cl.
CPC ............... *H02K 1/20* (2013.01); *H02K 1/148* (2013.01); *H02K 3/24* (2013.01); *H02K 5/15* (2013.01)

(58) Field of Classification Search
CPC ............ H02K 5/203; H02K 5/20; H02K 9/19; H02K 9/193; H02K 9/197; H02K 3/24
See application file for complete search history.

(56) References Cited

U.S. PATENT DOCUMENTS

2011/0204736 A1* 8/2011 Lisi ........................ H02K 16/04 310/126
2017/0012480 A1 1/2017 Woolmer
(Continued)

FOREIGN PATENT DOCUMENTS

CN 206432797 A 8/2017
CN 108233562 A 6/2018
(Continued)

OTHER PUBLICATIONS

CN109510341A translation (Year: 2019).*
(Continued)

*Primary Examiner* — Oluseye Iwarere
*Assistant Examiner* — Nicholas Lee Setzer
(74) *Attorney, Agent, or Firm* — Womble Bond Dickinson (US) LLP

(57) ABSTRACT

A cooling structure for a disc electric motor is provided, including a stator core, a stator housing, a first baffle, a second baffle, a first coil, a second coil, and a partitioner. The first coil and the second coil are arranged on each of stator units. First coils on adjacent stator units are in a close fit with each other, and second coils on the adjacent stator units are in a close fit with each other. The partition plate is interposed between the first coil and the second coil. A third cooling
(Continued)

channel, through which a first cavity and a second cavity are communicated, is formed between the adjacent stator units.

7 Claims, 8 Drawing Sheets

(51) Int. Cl.

| | |
|---|---|
| ***H02K 3/24*** | (2006.01) |
| ***H02K 5/15*** | (2006.01) |

(56) References Cited

U.S. PATENT DOCUMENTS

| | | | | |
|---|---|---|---|---|
| 2021/0351658 | A1* | 11/2021 | Jore | H02K 1/14 |
| 2022/0115924 | A1* | 4/2022 | Zhang | H02K 1/2795 |

FOREIGN PATENT DOCUMENTS

| | | | | | |
|---|---|---|---|---|---|
| CN | 108551235 | A | | 9/2018 | |
| CN | 109462311 | A | | 3/2019 | |
| CN | 109510341 | A | * | 3/2019 | H02K 9/197 |
| CN | 211127334 | U | | 7/2020 | |
| CN | 111725939 | A | * | 9/2020 | H02K 5/20 |
| CN | 112186920 | A | | 1/2021 | |
| CN | 112186919 | A | | 4/2021 | |
| CN | 213185660 | U | | 5/2021 | |
| CN | 213185661 | U | | 5/2021 | |
| JP | 2006033965 | A | * | 2/2006 | |
| JP | 2009033898 | A | * | 2/2009 | |
| JP | 2010051075 | A | | 3/2010 | |
| JP | 6270213 | B2 | | 1/2018 | |

OTHER PUBLICATIONS

JP2006033965A translation (Year: 2006).*
JP2009033898A translation (Year: 2009).*
CN111725939A translation (Year: 2020).*
Chinese Office action for Application No. 202011195375.X, dated Dec. 28, 2024, 15 pages.
Chinese Office action for Application No. 202011190399.6, dated Dec. 28, 2024, 12 pages.
European Search Report for Application No. 21884272.2 dated Sep. 20, 2024, 12 pages.
International Search Report with English translation and Written Opinion of PCT/CN2021/072814, Jul. 16, 2021, 13 pages.

* cited by examiner

COOLING STRUCTURE FOR DISC-TYPE MOTOR

The present application is a national phase application of International application No. PCT/CN2021/072814, filed on Jan. 20, 2021, which claims priorities to Chinese patent application No. 202011195375.X, titled "COOLING STRUCTURE FOR DISC ELECTRIC MOTOR", filed on Oct. 30, 2020, and Chinese patent application No. 202011190399.6, titled "COOLING STRUCTURE FOR DISC ELECTRIC MOTOR", filed on Oct. 30, 2020, which are incorporated herein by reference in their entireties.

FIELD

The present application relates to the technical field of heat dissipation of a disc electric motor, and in particular to a cooling structure for a disc electric motor.

BACKGROUND

In order to improve the working efficiency of a disc electric motor, a cooling system is designed for the disc electric motor. There are two cooling systems. One is air cooling, and the other is liquid cooling. The liquid cooling has more efficiency than air cooling. The conventional liquid cooling system mainly runs in an external cooling mode in which coolant contacts indirectly with to-be-cooled parts, and thus has a low cooling efficiency, thereby affecting the service life of the disc electric motor.

Therefore, how to prolong the service life of the disc electric motor has attracted the attention of those skilled in the art.

SUMMARY

An object of the present application is to provide a cooling structure for a disc electric motor to prolong the service life of the disc electric motor.

In order to achieve the above object, a cooling structure for a disc electric motor is provided according to an embodiment of the present application. The cooling structure includes:

a stator core having multiple stator units;

a stator housing enclosing the stator core, where a first cavity is defined by the stator housing and an outer side of the stator core, a second cavity is defined by the stator housing and an inner side of the stator core, wherein the stator housing is provided with a liquid inlet channel, a liquid outlet channel, a liquid inlet, a liquid outlet, a liquid spray port and a liquid return port, wherein the liquid inlet and the liquid spray port are communicated through the liquid inlet channel, and the liquid outlet and the liquid return port are communicated the liquid outlet channel;

a first baffle and a second baffle arranged between the outer side of the stator core and the stator housing, where the first baffle and the second baffle separate the first cavity into a first cooling channel and a second cooling channel, the first cooling channel is communicated with the liquid outlet, and the second cooling channel is communicated with the liquid return port;

a first coil and a second coil arranged on each of the multiple stator units, where first coils on adjacent ones of the stator units are in a close fit with each other, and second coils on the adjacent stator units are in a close fit with each other; and a partitioner interposed between the first coil and the second coil, where a third cooling channel, through which the first cavity and the second cavity are communicated, is formed between the adjacent stator units.

In an embodiment of the present application, the partitioner includes a first partitioner and a second partitioner. The first partitioner is arranged at an outer side of the stator unit, and the second partitioner is arranged at an inner side of the stator unit.

In an embodiment of the present application, the first partitioner has a width smaller than a width of the outer side of the stator unit.

In an embodiment of the present application, the first partitioner is fixed on the first coil and the second coil.

In an embodiment of the present application, the second partitioner has a width smaller than a width of the inner side of the stator unit.

In an embodiment of the present application, the second partitioner is fixed on the first coil and the second coil.

In an embodiment of the present application, the stator housing includes an outer stator housing, an inner stator housing, a front stator plate and a rear stator plate, the stator core is arranged between the outer stator housing and the inner stator housing, the front stator plate is arranged on a first end face of the outer stator housing, the rear stator plate is arranged on a second end face of the outer stator housing, the first cavity is defined by the outer stator housing, the outer side of the stator core, the front stator plate and the rear stator plate, and the second cavity is defined by the inner stator housing, the inner side of the stator core, the front stator plate and the rear stator plate.

In an embodiment of the present application, one or more of the liquid inlet, the liquid outlet, the liquid spray port and the liquid return port are arranged at the outer stator housing, the inner stator housing, the front stator plate or the rear stator plate.

In an embodiment of the present application, the number of the liquid spray port is more than one, and each of the more than one liquid spray port corresponds to a middle part of a corresponding stator unit of the stator units.

In an embodiment of the present application, the stator core is a segmented core.

With the cooling structure for a disc electric motor according to the present application, liquid refrigerant enters the liquid inlet channel from the liquid inlet, and enters the first cooling channel through the liquid spray port; the liquid refrigerant in the first cooling channel exchanges heat with the first coil and the second coil at the outer side of the stator core, and then enters the third cooling channel, then the liquid refrigerant exchanges heat with the first coil and the second coil on the stator unit corresponding to the third cooling channel, and enters the second cavity. The liquid refrigerant in the second cavity exchanges heat with the first coil and the second coil at the inner side of the stator core, and then enters the third cooling channel, then the liquid refrigerant exchanges heat with the first coil and the second coil on the stator unit corresponding to the third cooling channel, and enters the second cooling channel. The liquid refrigerant in the second cooling channel exchanges heat with the first coil and the second coil at the outer side of the stator core, then enters the liquid outlet channel through the liquid return port, and flows out from the liquid outlet. It can be seen that in the above process, the liquid refrigerant can fully and directly contact and exchange heat with core heat-generating parts such as the stator core, the first coil and the second coil, thereby improving the heat dissipation efficiency of the disc electric motor and prolonging the service life of the disc electric motor.

A cooling structure for a disc electric motor is further provided according to another embodiment of the present application. The cooling structure includes:

- a stator core having multiple stator units;
- a stator housing enclosing the stator core, where a first cavity is defined by the stator housing and an outer side of the stator core, a second cavity is defined by the stator housing and an inner side of the stator core, where the stator housing is provided with a liquid inlet channel, a liquid outlet channel, a liquid inlet, a liquid outlet, a liquid spray port and a liquid return port, where the liquid inlet and the liquid spray port are communicated through the liquid inlet channel, and the liquid outlet and the liquid return port are communicated through the liquid outlet channel;
- a first baffle and a second baffle arranged between the outer side of the stator core and the stator housing, where the first baffle and the second baffle are configured to separate the first cavity into a first cooling channel and a second cooling channel, the first cooling channel is communicated with the liquid outlet, and the second cooling channel is communicated with the liquid return port;
- multiple first coils and multiple second coils arranged on each of the multiple stator units, where the multiple first coils have a width different from that of the multiple second coils; and
- a third baffle interposed between adjacent ones of the stator units, where a third cooling channel, through which the first cavity and the second cavity are communicated, is formed by the third baffle and a first coil and a second coil adjacent to each other.

In an embodiment of the present application, the first coils and the second coils are alternately arranged on each of the multiple stator units.

In an embodiment of the present application, the first coils have a width smaller than a width of the second coils.

In an embodiment of the present application, the third baffle abuts against second coils on stator units adjacent to the third baffle.

In an embodiment of the present application, the first baffle is arranged on a middle line of the liquid inlet and the liquid outlet.

In an embodiment of the present application, the second baffle is arranged on the middle line of the liquid inlet and the liquid outlet.

In an embodiment of the present application, the stator housing includes an outer stator housing, an inner stator housing, a front stator plate and a rear stator plate, the stator core is arranged between the outer stator housing and the inner stator housing, the front stator plate is arranged on a first end face of the outer stator housing, the rear stator plate is arranged on a second end face of the outer stator housing, the first cavity is defined by the outer stator housing, the outer side of the stator core, the front stator plate and the rear stator plate, and the second cavity is defined by the inner stator housing, the inner side of the stator core, the front stator plate and the rear stator plate.

In an embodiment of the present application, one or more of the liquid inlet, the liquid outlet, the liquid spray port and the liquid return port are arranged at the outer stator housing, the inner stator housing, the front stator plate or the rear stator plate.

In an embodiment of the present application, the number of the liquid spray port is more than one, and each of the more than one liquid spray port corresponds to a middle part of a corresponding stator unit of the stator units.

In an embodiment of the present application, the stator core is a segmented core.

With the cooling structure for a disc electric motor according to the present application, liquid refrigerant enters the liquid inlet channel from the liquid inlet, and enters the first cooling channel through the liquid spray port; the liquid refrigerant in the first cooling channel exchanges heat with the first coil and the second coil at the outer side of the stator core, and then enters the third cooling channel, then the liquid refrigerant exchanges heat with the first coil and the second coil on the stator unit corresponding to the third cooling channel, and enters the second cavity. The liquid refrigerant in the second cavity exchanges heat with the first coil and the second coil at the inner side of the stator core, and then enters the third cooling channel, then the liquid refrigerant exchanges heat with the first coil and the second coil on the stator unit corresponding to the third cooling channel, and enters the second cooling channel. The liquid refrigerant in the second cooling channel exchanges heat with the first coil and the second coil at the outer side of the stator core, then enters the liquid outlet channel through the liquid return port, and flows out from the liquid outlet. It can be seen that in the above process, the liquid refrigerant can fully and directly contact and exchange heat with core heat-generating parts such as the stator core, the first coil and the second coil, thereby improving the heat dissipation efficiency of the disc electric motor and prolonging the service life of the disc electric motor.

BRIEF DESCRIPTION OF THE DRAWINGS

For more clearly illustrating technical solutions in embodiments of the present application or in the conventional technology, drawings used in the description of the embodiments or the conventional technology will be briefly described hereinafter. Apparently, the drawings in the following description illustrate only some embodiments of the present application. For those skilled in the art, other drawings may be obtained based on the provided drawings without any creative efforts.

Figure 1:
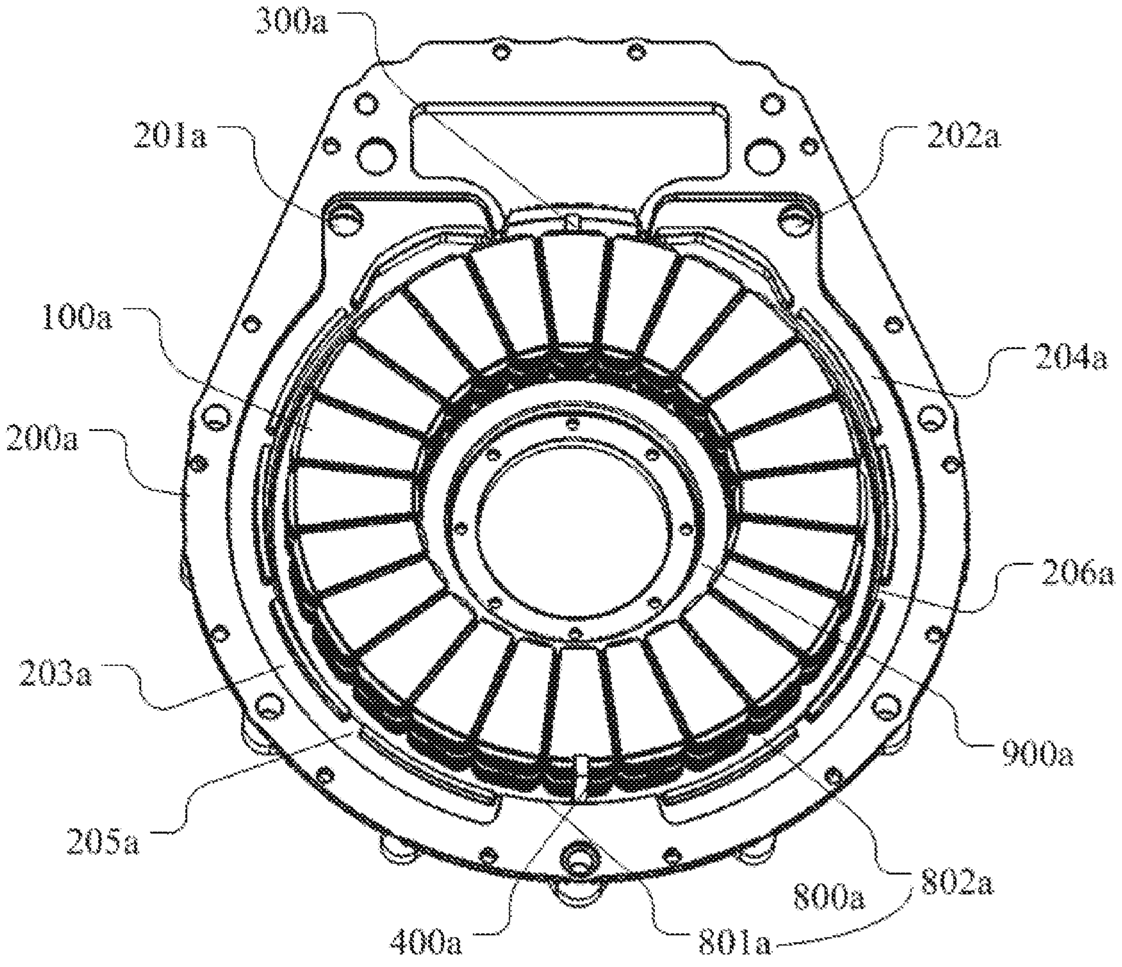
FIG. 1 is a schematic three-dimensional structural diagram of a cooling structure for a disc electric motor according to an embodiment of the present application.

Reference numerals in the figures: 100*a* stator core, 200*a* stator housing, 300*a* first baffle, 400*a* second baffle, 500*a* first coil, 600*a* second coil, 700*a* partitioner, 800*a* first cavity, 900*a* second cavity, 101*a* stator unit, 201*a* liquid inlet, 202*a* liquid outlet, 203*a* liquid inlet channel, 204*a* liquid outlet channel, 205*a* liquid spray port, 206*a* liquid return port, 701*a* first partitioner, 702*a* second partitioner, 801*a* first cooling channel, 802*a* second cooling channel, 200-1*a* outer stator housing, 200-2*a* inner stator housing, 200-3*a* front stator plate, 200-4*a* rear stator plate;

100*b* stator core, 200*b* stator housing, 300*b* first baffle, 400*b* second baffle, 500*b* first coil, 600*b* second coil, 700*b* third baffle, 800*b* first cavity, 900*b* second cavity, 101*b* stator unit, 201*b* liquid inlet, 202*b* liquid outlet, 203*b* liquid inlet channel, 204*b* liquid outlet channel, 205*b* liquid spray port, 206*b* liquid return port, 801*b* first cooling channel, 802*b* second cooling channel, 200-1*b* outer stator housing, 200-2*b* inner stator housing, 200-3*b* front stator plate, 200-4*b* rear stator plate.

DETAILED DESCRIPTION OF THE EMBODIMENTS

A core of the present application is to provide a cooling structure for a disc electric motor to prolong the service life of the disc electric motor.

In order to enable those skilled in the art to better understand technical solutions of the present application, the present application is further described in detail in conjunction with drawings and embodiments.

First Embodiment

Figure 2:
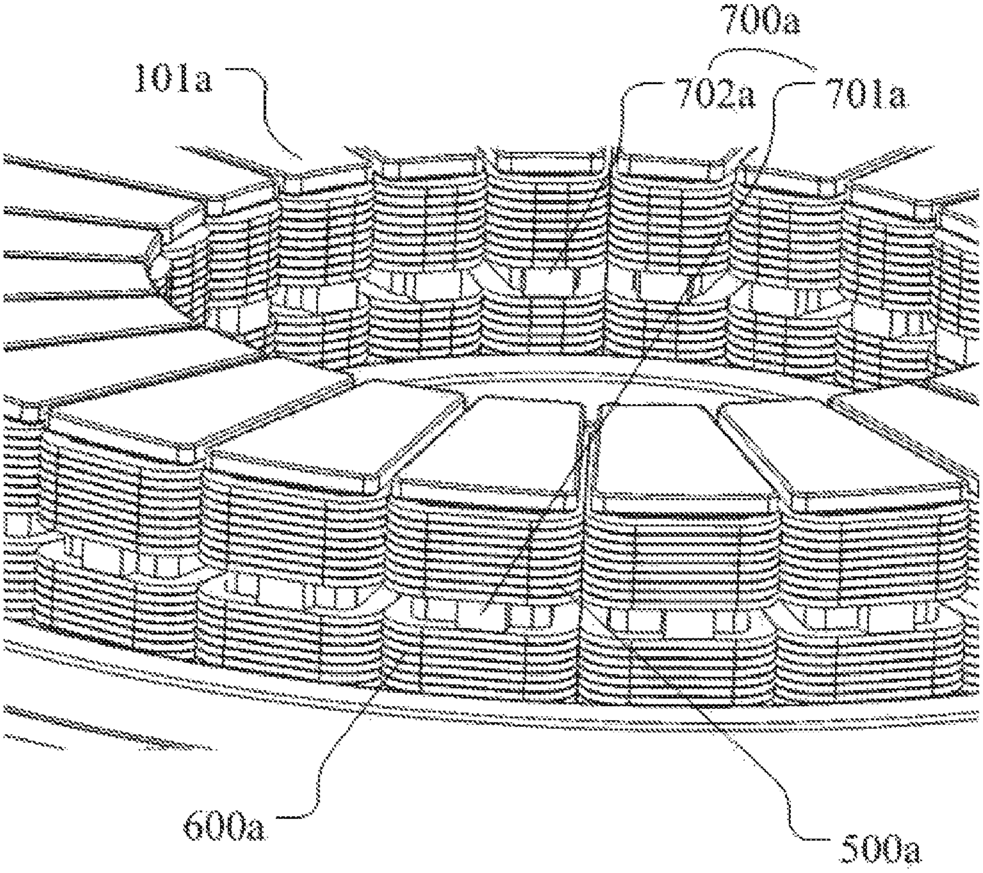
FIG. 2 is a partially enlarged schematic diagram of the cooling structure for a disc electric motor according to an embodiment of the present application.
Figure 3:
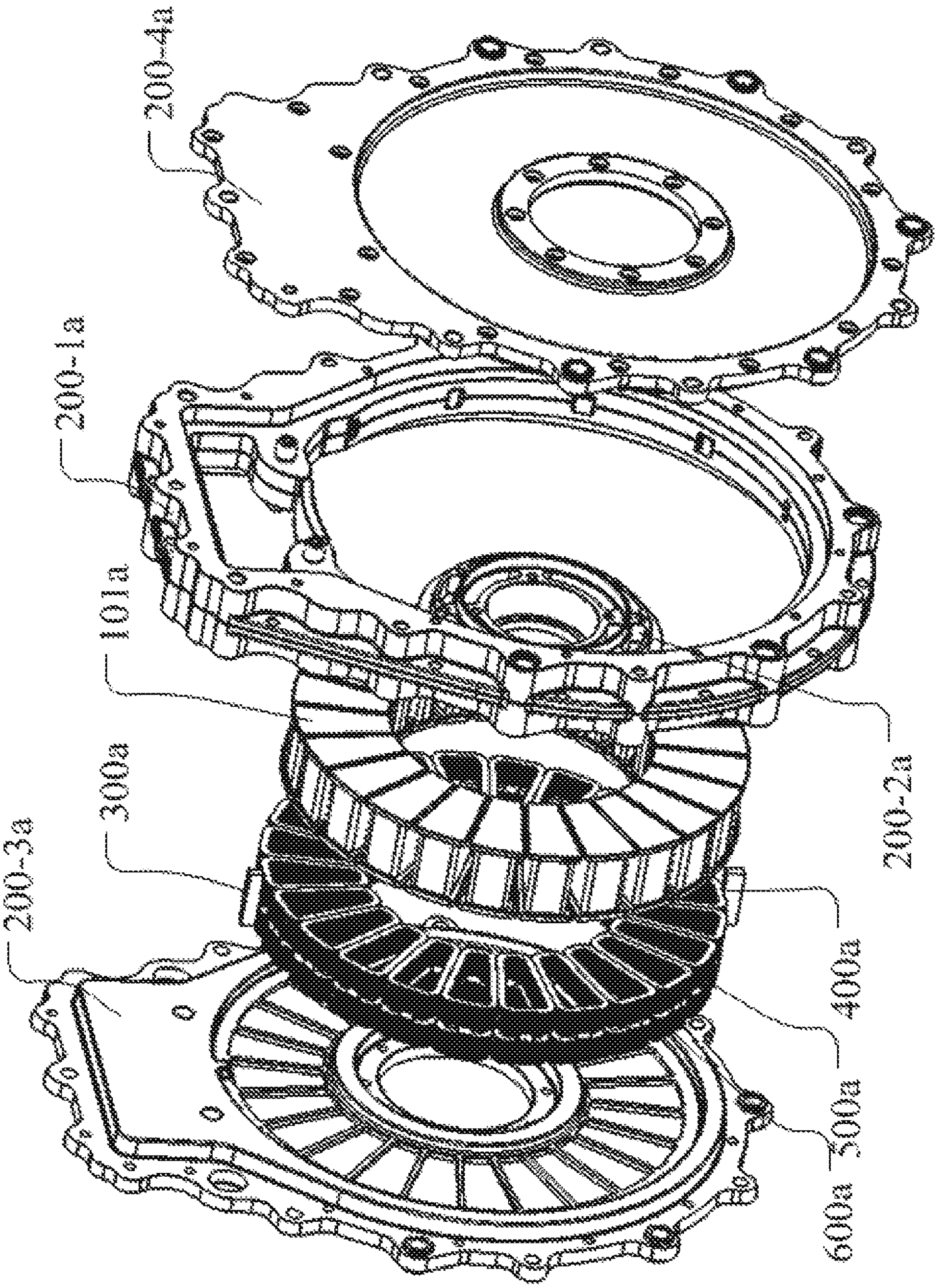
FIG. 3 is a schematic exploded structural diagram of the cooling structure for a disc electric motor according to an embodiment of the present application.
Figure 4:
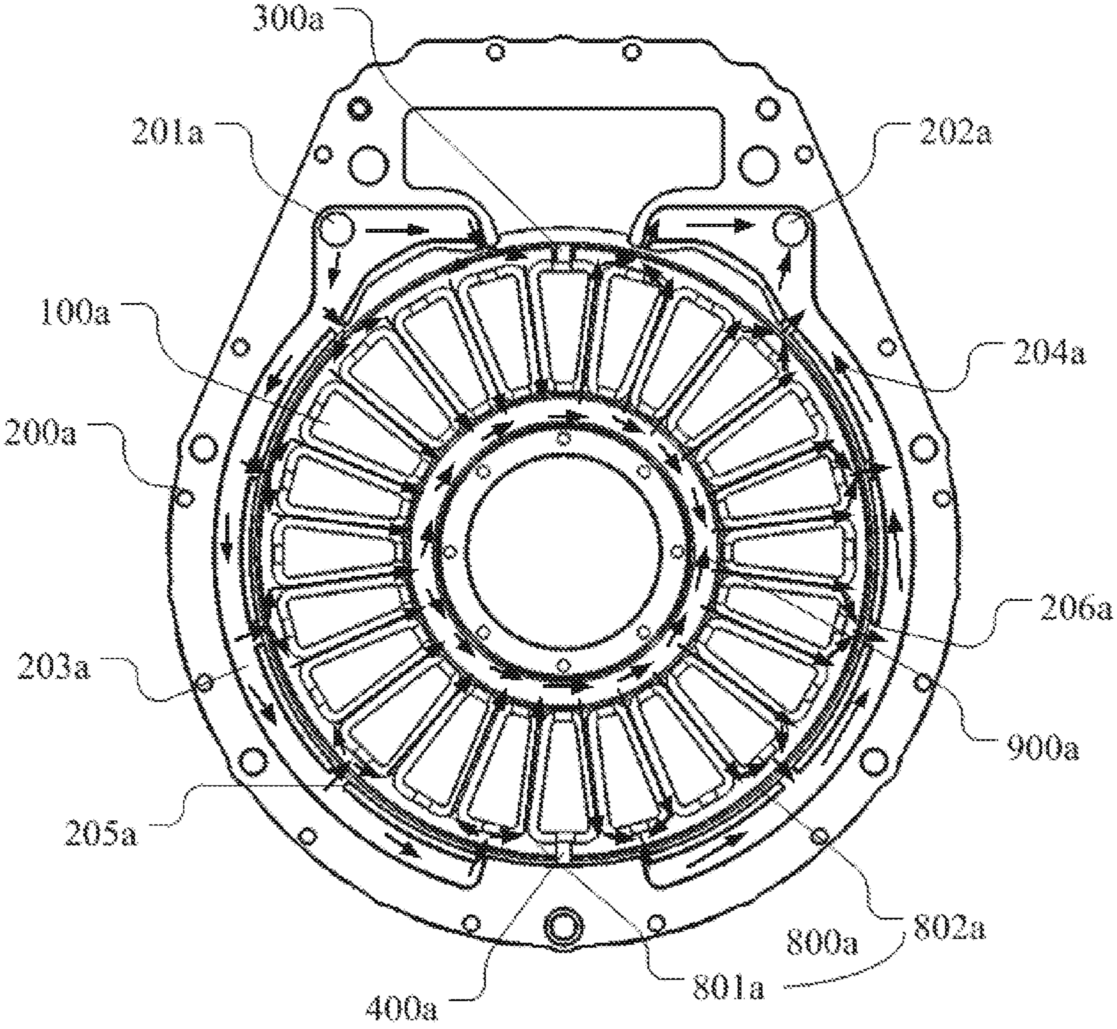
FIG. 4 is a schematic diagram of a principle of the cooling structure for a disc electric motor according to an embodiment of the present application.

Referring to FIG. 1 to FIG. 4, a cooling structure for a disc electric motor according to the present application includes a stator core 100*a*, a stator housing 200*a*, a first baffle 300*a*, a second baffle 400*a*, a first coil 500*a*, a second coil 600*a* and a partitioner 700*a*. The stator core 100*a* has multiple stator units 101*a*; the stator housing 200*a* encloses the stator core 100*a*, a first cavity 800*a* is defined by the stator housing 200*a* and an outer side of the stator core 100*a*, and a second cavity 900*a* is defined by the stator housing 200*a* and an inner side of the stator core 100*a*. The stator housing 200*a* is provided with a liquid inlet channel 203*a*, a liquid outlet channel 204*a*, a liquid inlet 201*a*, a liquid outlet 202*a*, a liquid spray port 205*a* and a liquid return port 206*a*, the liquid inlet 201*a* and the liquid spray port 205*a* are communicated through the liquid inlet channel 203*a*, and the liquid outlet 202*a* and the liquid return port 206*a* are communicated through the liquid outlet channel 204*a*. The first baffle 300*a* and the second baffle 400*a* are arranged between the outer side of the stator core 100*a* and the stator housing 200*a*, the first baffle 300*a* and the second baffle 400*a* are configured to separate the first cavity 800*a* into a first cooling channel 801*a* and a second cooling channel 802*a*, the first cooling channel 801*a* is communicated with the liquid outlet 202*a*, and the second cooling channel 802*a* is communicated with the liquid return port 206*a*. The first coil 500*a* and the second coil 600*a* are arranged on each of the multiple stator units 101*a*, first coils 500*a* on adjacent ones of the stator units 101*a* are in a close fit with each other, and second coils 600*a* on the adjacent stator units 101*a* are in a close fit with each other. The partitioner 700*a* is interposed between the first coil 500*a* and the second coil 600*a*, and a third cooling channel, through which the first cavity 800*a* and the second cavity 900*a* are communicated, is formed between the adjacent stator units 101*a*.

With the cooling structure for a disc electric motor according to the present application, liquid refrigerant enters the liquid inlet channel 203*a* from the liquid inlet 201*a*, and enters the first cooling channel 801*a* through the liquid spray port; the liquid refrigerant in the first cooling channel 801*a* exchanges heat with the first coil 500*a* and the second coil 600*a* at the outer side of the stator core 100*a*, and then enters the third cooling channel, then the liquid refrigerant exchanges heat with the first coil 500*a* and the second coil 600*a* on the stator unit 101*a* corresponding to the third cooling channel, and enters the second cavity 900*a*. The liquid refrigerant in the second cavity 900*a* exchanges heat with the first coil 500*a* and the second coil 600*a* at the inner side of the stator core 100*a*, and then enters the third cooling channel, then the liquid refrigerant exchanges heat with the first coil 500*a* and the second coil 600*a* on the stator unit 101*a* corresponding to the third cooling channel, and enters the second cooling channel 802*a*. The liquid refrigerant in the second cooling channel 802*a* exchanges heat with the first coil 500*a* and the second coil 600*a* at the outer side of the stator core 100*a*, then enters the liquid outlet channel 204*a* through the liquid return port 206*a*, and flows out from the liquid outlet 202*a*. It can be seen that in the above process, the liquid refrigerant can fully and directly contact and exchange heat with core heat-generating parts such as the stator core 100*a*, the first coil 500*a* and the second coil 600*a*, thereby improving the heat dissipation efficiency of the disc electric motor and prolonging the service life of the disc electric motor.

The partitioner 700*a* is used to separate the first coil 500*a* from the second coil 600*a*, so that the third cooling channel is formed by the first coil 500*a*, the second coil 600*a* and the stator unit 101*a*, and the core heat-generating parts such as the stator unit 101*a*, the first coil 500*a* and the second coil 600*a* at the periphery of the third cooling channel are radiated through the third cooling channel. The thicknesses of the first coil 500*a* and the second coil 600*a* may be equal or different. In order to improve the cooling effect of the stator core 100*a*, the thicknesses of the first coil 500*a* and the second coil 600*a* are equal.

In order to reduce an occupied volume of the partitioner 700*a*, increase a sectional area of the third cooling channel, and increase contact areas of the stator unit 101*a*, the first coil 500*a*, and the second coil 600*a* with the third cooling channel, the partitioner 700*a* includes a first partitioner 701*a* and a second partitioner 702*a*. The first partitioner 701*a* is arranged at the outer side of the stator unit 101*a*, and the second partitioner 702*a* is arranged at the inner side of the stator unit 101*a*. The first partitioner 701*a* and the second partitioner 702*a* each has a cubic structure, and a structure that can separate the first coil 500*a* from the second coil 600*a* may be understood as the partitioner 700*a*.

The first partitioner 701*a* has a width greater than, equal to or smaller than the width of the outer side of the stator unit 101*a*, which falls within the protection scope of the present application, as long as the third cooling channel is formed between adjacent stator units 101*a*. In an embodiment, the first partitioner 701*a* has a width smaller than the width of the outer side of the stator unit 101*a*, which can not only reduce the material of the first partitioner 701*a*, but also increase the effective contact area between the stator unit 101*a* and the third cooling channel.

The first partitioner 701*a* is fixed on the first coil 500*a* and the second coil 600*a*, or the first partitioner 701*a* is fixed on the stator unit 101*a*. The first partitioner 701*a* may be fixed on the first coil 500*a* and the second coil 600*a*, or the stator unit 101*a* in a bonding manner.

The second partitioner 702*a* has a width greater than, equal to or smaller than the width of the inner side of the stator unit 101*a*, which falls within the protection scope of the present application, as long as the third cooling channel is formed between adjacent stator units 101*a*. In an embodiment, the second partitioner 702*a* has a width smaller than the width of the outer side of the stator unit 101*a*, which can not only reduce the material of the second partitioner 702*a*, but also increase the effective contact area between the stator unit 101*a* and the third cooling channel.

The second partitioner 702*a* is fixed on the first coil 500*a* and the second coil 600*a*, or the second partitioner 702*a* is fixed on the stator unit 101*a*. The second partitioner 702*a* may be fixed on the first coil 500*a* and the second coil 600*a*, or the stator unit 101*a* in a bonding manner.

It should be noted that the thickness and the width may be understood as follows, with the stator core 100*a* being taken as a whole for explanation, a length of the stator core 100*a* in an axial direction represents the thickness, and a length of the stator core 100*a* in a circumference direction represents the width, the thickness of the stator unit 101*a* is a distance between an upper end face and a lower end face of the stator unit 101*a* in the axial direction, and the width of the stator unit 101*a* is a distance between two side surfaces of the stator unit 101*a*. Since the stator unit 101*a* has a structure similar to a trapezoidal shape, a distance between two side surfaces, closer to an axis center of the stator core 100*a*, of the stator unit 101*a* is small, and a distance between two side surfaces, away from the axis center of the stator core 100*a*, of the stator unit 101*a* is large.

The stator housing 200*a* is used to mount the stator core 100*a*. The stator housing 200*a* includes an outer stator housing 200-1*a*, an inner stator housing 200-2*a*, a front stator plate 200-3*a* and a rear stator plate 200-4*a*. The stator core 100*a* is interposed between the outer stator housing and the inner stator housing 200-2*a*, the front stator plate 200-3*a* is arranged on a first end face of the outer stator housing 200-1*a*, the rear stator plate 200-4*a* is arranged on a second end face of the outer stator housing 200-1*a*, a first cavity 800*a* is defined by the outer stator housing 200-1*a*, the outer side of the stator core 100*a*, the front stator plate 200-3*a* and the rear stator plate 200-4*a*, and a second cavity 900*a* is defined by the inner stator housing 200-2*a*, the inner side of the stator core 100*a*, the front stator plate 200-3*a* and the rear stator plate 200-4*a*. The above is only one of structural forms of the stator housing 200*a*, and any structure that can enclose the stator core 100*a* may be used as the stator housing 200*a*, which is not described in detail here in the embodiment of the present application.

In the above structure, one or more of the liquid inlet 201*a*, the liquid outlet 202*a*, the liquid spray port 205*a* and the liquid return port 206*a* are arranged at the outer stator housing 200-1*a*, the inner stator housing 200-2*a*, the front stator plate 200-3*a* or the rear stator plate 200-4*a*. It can be understood here that the liquid inlet 201*a*, the liquid outlet 202*a*, the liquid spray port 205*a* and the liquid return port 206*a* may be all arranged at the outer stator housing 200-1*a*, or all arranged at the inner stator housing 200-2*a*, or all arranged at the front stator plate 200-3*a*, or all arranged at the rear stator plate 200-4*a*. Any two of the liquid inlet 201*a*, the liquid outlet 202*a*, the liquid spray port 205*a* and the liquid return port 206*a* may be arranged at the outer stator housing 200-1*a*, or arranged at the inner stator housing 200-2*a*, or arranged at the front stator plate 200-3*a*, or arranged at the rear stator plate 200-4*a*. Any three of the liquid inlet 201*a*, the liquid outlet 202*a*, the liquid spray port 205*a* and the liquid return port 206*a* may be arranged at the outer stator housing 200-1*a*, or arranged at the inner stator housing 200-2*a*, or arranged at the front stator plate 200-3*a*, or arranged at the rear stator plate 200-4*a*. Of course, the liquid inlet 201*a*, the liquid outlet 202*a*, the liquid spray port 205*a* and liquid return port 206*a* may be arranged across components, for example, a part of the liquid inlet channel 203*a* is arranged at the outer stator housing 200-1*a*, another part of the liquid inlet channel 203*a* is arranged at the front stator plate 200-3*a*, a part of the liquid outlet channel 204*a* is arranged at the outer stator housing 200-1*a*, and another part of the liquid outlet channel 204*a* is arranged at the front stator plate 200-3*a*. In the figure, the liquid inlet 201*a*, the liquid outlet 202*a*, the liquid spray port 205*a* and the liquid return port 206*a* are all arranged at the outer stator housing 200-1*a*.

In an embodiment of the present application, the number of the liquid spray port 205*a* is more than one, each of the more than one liquid spray port 205*a* corresponds to a middle part of a corresponding stator unit 101*a* of the stator units 101*a*; or each of the more than one liquid spray port 205*a* corresponds to the third cooling channel. In order to prolong a time period in which the liquid refrigerant stays in the first cooling channel 801*a*, each liquid spray port 205*a* in the present application corresponds to a middle part of a corresponding stator unit 101*a* of the stator units 101*a*, as the liquid refrigerant enters the first cooling channel 801*a* through the liquid spray port 205*a*, the liquid refrigerant, under a relatively high pressure, is first sprayed onto the stator unit 101*a*, and then flows to two sides under the reflection of the stator unit 101*a*, thereby prolonging the time period in which the liquid refrigerant stays in the first cooling channel 801*a* and improving the efficiency of heat dissipation.

The stator core 100*a* is a segmented core or an integral core.

Second Embodiment

Figure 5:
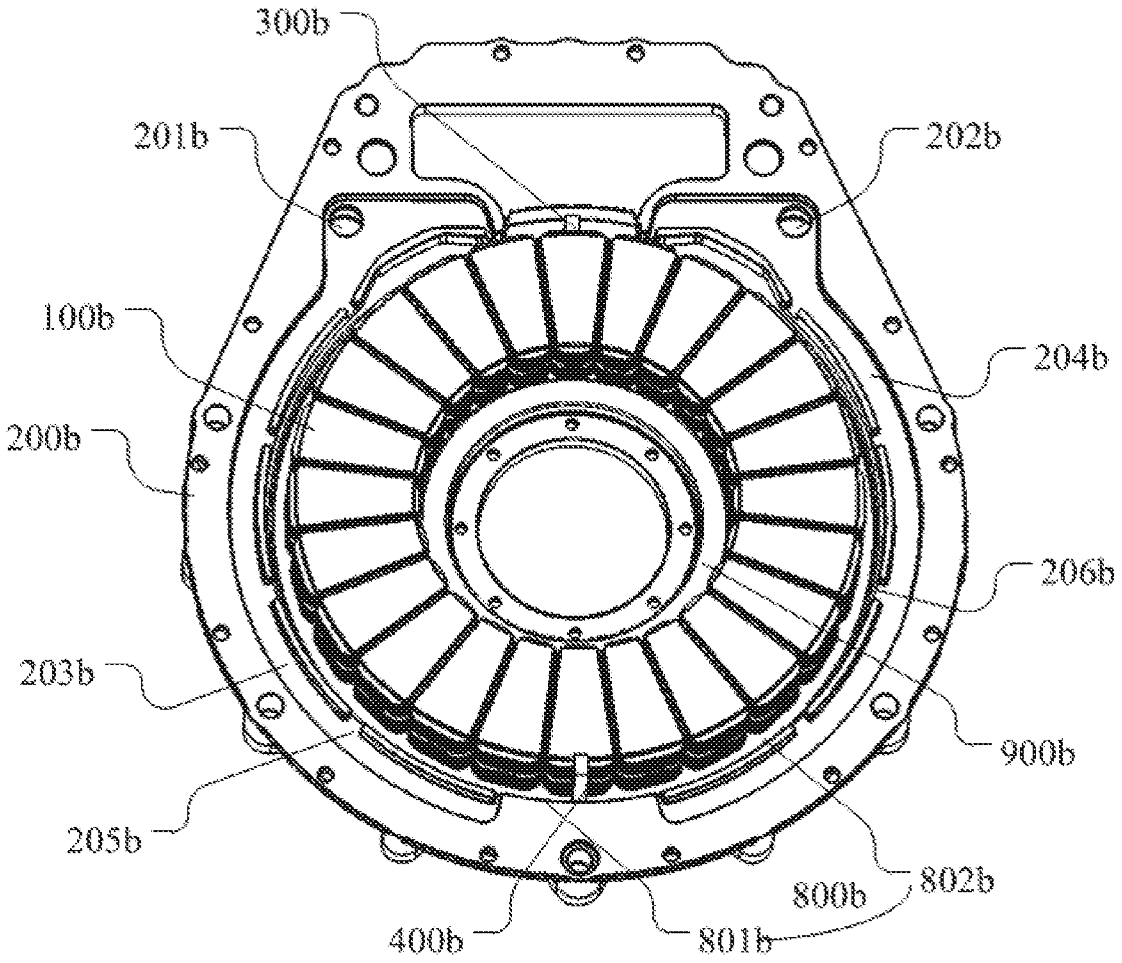
FIG. 5 is a schematic three-dimensional structural diagram of a cooling structure for a disc electric motor according to another embodiment of the present application.
Figure 6:
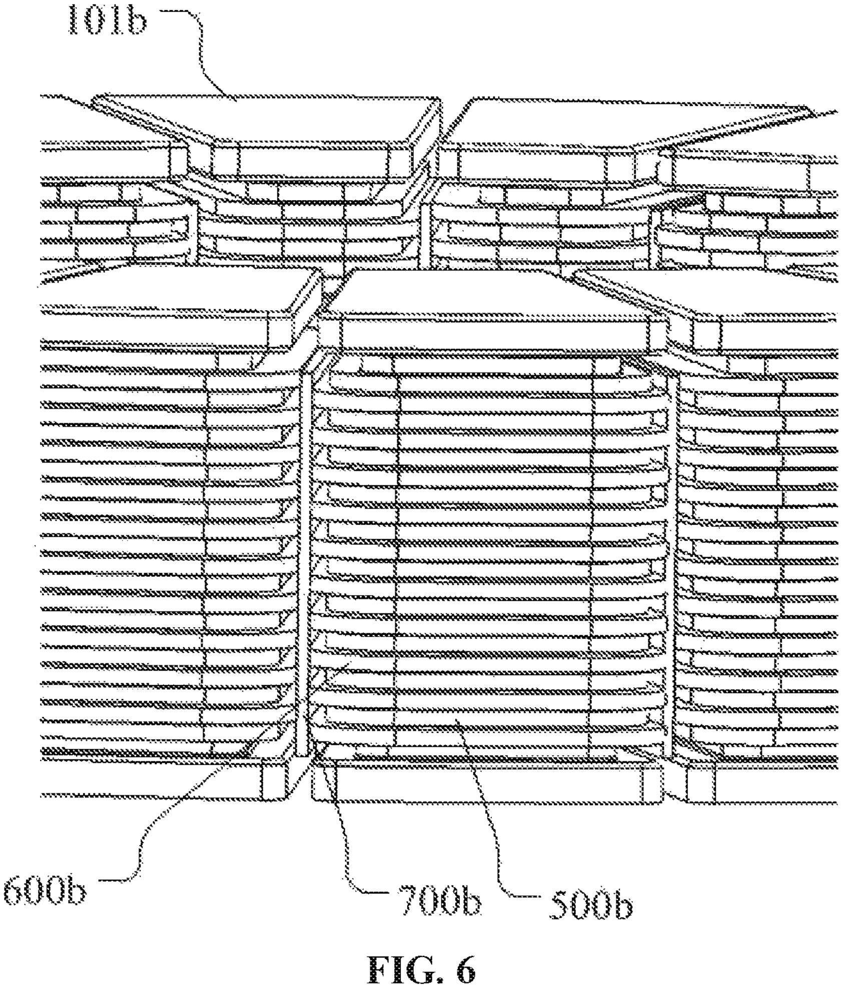
FIG. 6 is a partially enlarged schematic diagram of the cooling structure for a disc electric motor according to another embodiment of the present application.
Figure 7:
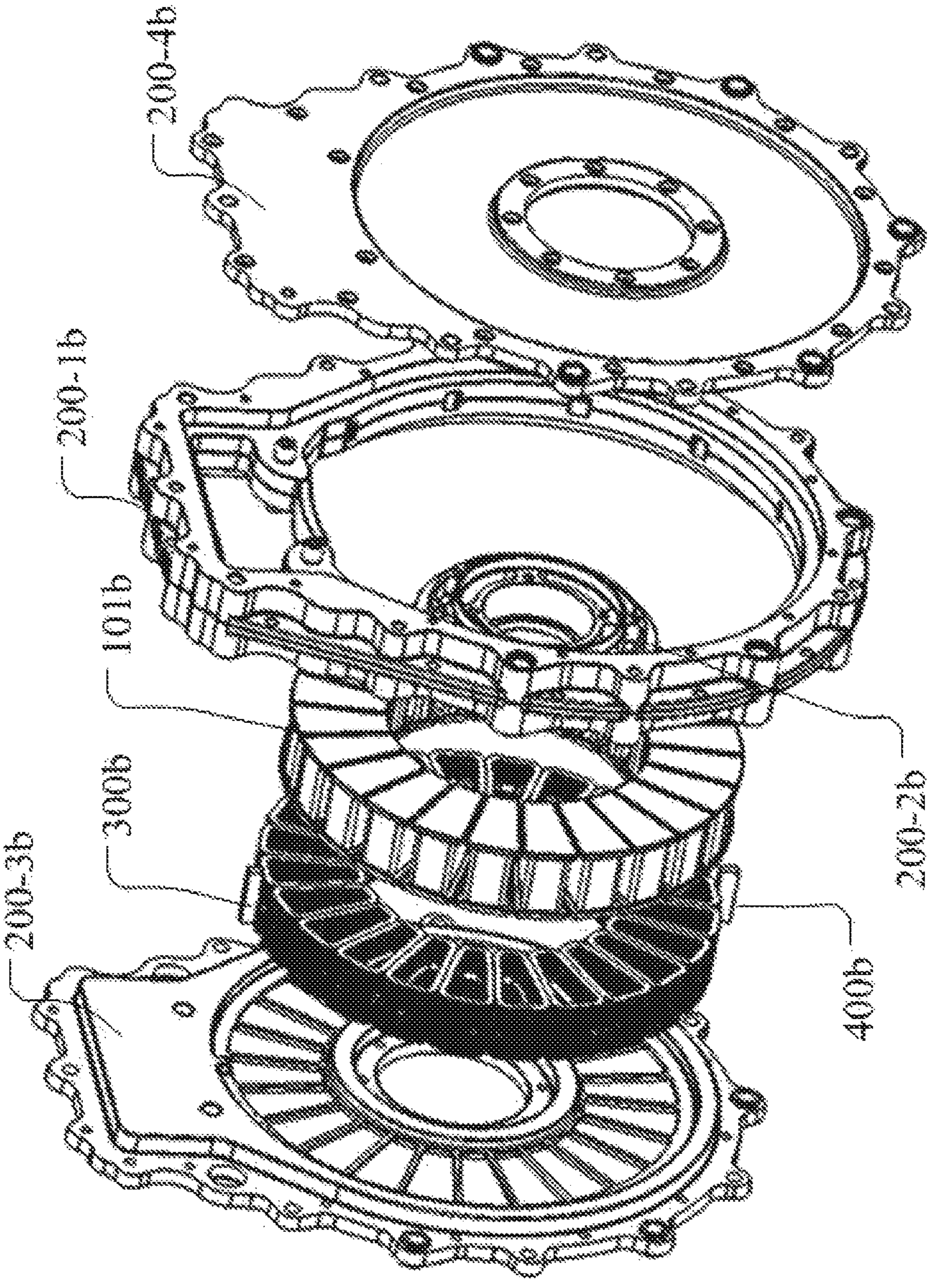
FIG. 7 is a schematic exploded structural diagram of the cooling structure for a disc electric motor according to another embodiment of the present application.
Figure 8:
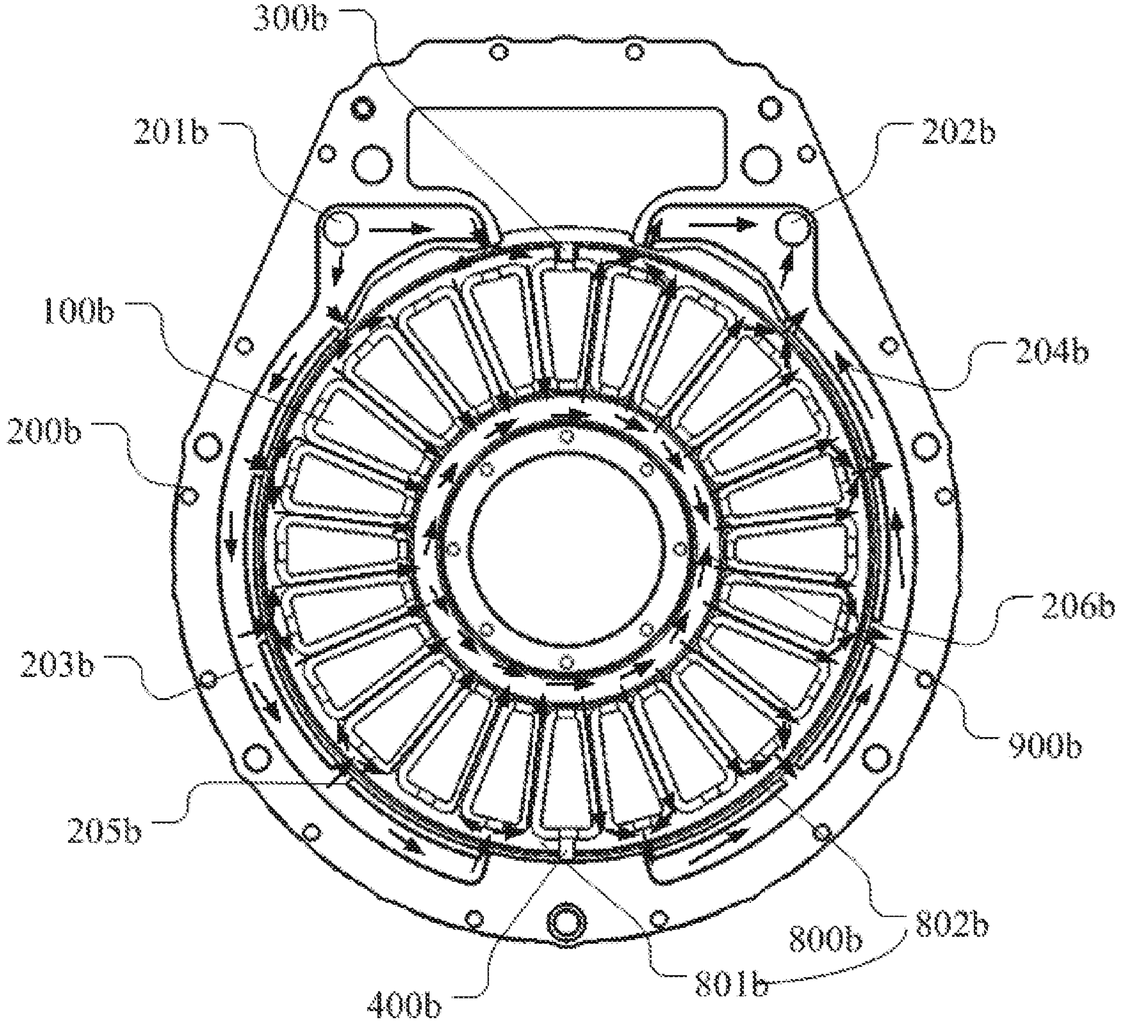
FIG. 8 is a schematic diagram of a principle of the cooling structure for a disc electric motor according to another embodiment of the present application.

Referring to FIG. 5 to FIG. 8, a cooling structure for a disc electric motor according to the present application includes a stator core 100*b*, a stator housing 200*b*, a first baffle 300*b*, a second baffle 400*b*, a first coil 500*b*, a second coil 600*b* and a third baffle 700*b*. The stator core 100*b* has multiple stator units 101*b*; the stator housing 200*b* encloses the stator core 100*b*, a first cavity 800*b* is defined by the stator housing 200*b* and an outer side of the stator core 100*b*, and a second cavity 900*b* is defined by the stator housing 200*b* and an inner side of the stator core 100*b*. The stator housing 200*b* is provided with a liquid inlet channel 203*b*, a liquid outlet channel 204*b*, a liquid inlet 201*b*, a liquid outlet 202*b*, a liquid spray port 205*b* and a liquid return port 206*b*, the liquid inlet 201*b* and the liquid spray port 205*b* are communicated through the liquid inlet channel 203*b*, and the liquid outlet 202*b* and the liquid return port 206*b* are communicated through the liquid outlet channel 204*b*. The first baffle 300*b* and the second baffle 400*b* are arranged between the outer side of the stator core 100*b* and the stator housing 200*b*, the first baffle 300*b* and the second baffle 400*b* are configured to separate the first cavity 800*b* into a first cooling channel 801*b* and a second cooling channel 802*b*, the first cooling channel 801*b* is communicated with the liquid outlet 202*b*, and the second cooling channel 802*b* is communicated with the liquid return port 206*b*. The widths of the first coil 500*b* and the second coil 600*b* are different. Multiple first coils 500*b* and multiple second coils 600*b* are arranged on the stator unit 101*b*. The third baffle 700*b* is arranged between adjacent stator units 101*b*, and a third cooling channel, through which the first cavity 800*b* and the second cavity 900*b* are communicated, is formed by the third baffle 700*b* and a first coil 500*b* and a second coil 600*b* adjacent to each other.

With the cooling structure for a disc electric motor according to the present application, liquid refrigerant enters the liquid inlet channel 203*b* from the liquid inlet 201*b*, and enters the first cooling channel 801*b* through the liquid spray port; the liquid refrigerant in the first cooling channel 801*b* exchanges heat with the first coil 500*b* and the second coil 600*b* at the outer side of the stator core 100*b*, and then enters the third cooling channel, then the liquid refrigerant exchanges heat with the first coil 500*b* and the second coil 600*b* on the stator unit 101*b* corresponding to the third cooling channel, and enters the second cavity 900*b*. The liquid refrigerant in the second cavity 900*b* exchanges heat with the first coil 500*b* and the second coil 600*b* at the inner side of the stator core 100*b*, and then enters the third cooling channel, then the liquid refrigerant exchanges heat with the first coil 500*b* and the second coil 600*b* on the stator unit 101*b* corresponding to the third cooling channel, and enters the second cooling channel 802*b*. The liquid refrigerant in the second cooling channel 802*b* exchanges heat with the first coil 500*b* and the second coil 600*b* at the outer side of the stator core 100*b*, and then enters the liquid outlet channel 204*b* through the liquid return port 206*b*, and flows out from the liquid outlet 202*b*. It can be seen that in the above process, the liquid refrigerant can fully and directly contact and exchange heat with core heat-generating parts such as the stator core 100*b*, the first coil 500*b* and the second coil 600*b*, thereby improving the heat dissipation efficiency of the disc electric motor and prolonging the service life of the disc electric motor.

The third baffle 700*b* is used to define the third cooling channel together with the first coil 500*b* and the second coil 600*b* adjacent to each other, and the core heat-generating parts such as the stator unit 101*b*, the first coil 500*b* and the second coil 600*b* at the periphery of the third cooling channel are radiated through the third cooling channel. The widths of the first coil 500*b* and the second coil 600*b* are different. In an embodiment, the first coil 500*b* has a width smaller than the width of the second coil 600*b*.

In order to make the stator units generate uniform magnetic flux, multiple first coils 500*b* and multiple second coils 600*b* on each stator unit 101*b* are alternately arranged. That is, one of the two adjacent coils on each stator unit is the first coil 500*b*, and the other is the second coil 600*b*. In this way, the quantity of third cooling channels in two adjacent stator units 101*b* can be increased. Of course, the first coil and the second coil on each stator unit 101*b* may be arranged in a way that every two first coils 500*b* are spaced apart by multiple second coils 600*b*, which is not exemplified in the embodiment of the present application.

The third baffle 700*b* is interposed between adjacent stator units 101*b*. The third baffle 700*b* may abuts or not abut against the second coil 600*b* on the stator unit 101*b* adjacent to the third baffle 700*b*. Preferably, the third baffle 700*b* abuts against the second coil on the stator unit 101*b* adjacent to the third baffle 700*b*, thereby ensuring the machining precision.

It should be noted that the width may be understood as follows, with the stator core being taken as a whole for explanation, the length of the stator core 100*b* in an axial direction represents the thickness, and the length of the stator core 100*b* in a circumference direction represents the width, the thickness of the stator unit 101*b* is a distance between an upper end face and a lower end face of the stator unit 101*b* in the axial direction, and the width of the stator unit 101*b* is a distance between two side surfaces of the stator unit 101*b*. Since the stator unit 101*b* has a structure similar to a trapezoidal shape, a distance between two side surfaces, closer to an axis center of the stator core 100*b*, of the stator unit 101*b* is small, and a distance between two side surfaces, away from the axis center of the stator core 100*b*, of the stator unit 101*b* is large. For the coil arranged on the stator unit 101*b*, a distance between an outer surface of the coil and an inner surface of the coil is the width of the coil.

The lengths of the first cooling channel 801*b* and the second cooling channel 802*b* may be equal or different. In an embodiment of the present application, the length of the first cooling channel 801*b* is equal to the length of the second cooling channel 802*b*, the first baffle 400*b* is arranged on a middle line of the liquid inlet 201*b* and the liquid outlet 202*b*, and the second baffle 500*b* is arranged on the middle line of the liquid inlet 201*b* and the liquid outlet 202*b*. The above is only one arrangement of the first baffle 400*b* and the second baffle 500*b*. The first baffle 400*b* and the second baffle 500*b* may not be arranged on the middle line of the liquid inlet 201*b* and the liquid outlet 202*b*, and it can be understood that any structure which separates the first cavity 800*b* into the first cooling channel 801*b* and the second cooling channel 802*b* falls within the protection scope of the present application.

The stator housing 200*b* is used to mount the stator core 100*b*. The stator housing 200*b* includes an outer stator housing 200-1*b*, an inner stator housing 200-2*b*, a front stator plate 200-3*b* and a rear stator plate 200-4*b*. The stator core 100*b* is interposed between the outer stator housing and the inner stator housing 200-2*b*, the front stator plate 200-3*b* is arranged on a first end face of the outer stator housing 200-1*b*, the rear stator plate 200-4*b* is arranged on a second end face of the outer stator housing 200-1*b*, a first cavity 800*b* is defined by the outer stator housing 200-1*b*, the outer side of the stator core 100*b*, the front stator plate 200-3*b* and the rear stator plate 200-4*b*, and a second cavity 900*b* is defined by the inner stator housing 200-2*b*, the inner side of the stator core 100*b*, the front stator plate 200-3*b* and the rear stator plate 200-4*b*. The above is only one of structural forms of the stator housing 200*b*, and any structure that can enclose the stator core 100*b* may be used as the stator housing 200*b*, which is not described in detail here in the embodiment of the present application.

In the above structure, one or more of the liquid inlet 201*b*, the liquid outlet 202*b*, the liquid spray port 205*b* and the liquid return port 206*b* are arranged at the outer stator housing 200-1*b*, the inner stator housing 200-2*b*, the front stator plate 200-3*b* or the rear stator plate 200-4*b*. It can be understood here that the liquid inlet 201*b*, the liquid outlet 202*b*, the liquid spray port 205*b* and the liquid return port 206*b* may be all arranged at the outer stator housing 200-1*b*, or all arranged at the inner stator housing 200-2*b*, or all arranged at the front stator plate 200-3*b*, or all arranged at the rear stator plate 200-4*b*. Any two of the liquid inlet 201*b*, the liquid outlet 202*b*, the liquid spray port 205*b* and the liquid return port 206*b* may be arranged at the outer stator housing 200-1*b*, or arranged at the inner stator housing 200-2*b*, or arranged at the front stator plate 200-3*b*, or arranged at the rear stator plate 200-4*b*. Any three of the liquid inlet 201*b*, the liquid outlet 202*b*, the liquid spray port 205*b* and the liquid return port 206*b* may be arranged at the outer stator housing 200-1*b*, or arranged at the inner stator housing 200-2*b*, or arranged at the front stator plate 200-3*b*, or arranged at the rear stator plate 200-4*b*. Of course, the liquid inlet 201*b*, the liquid outlet 202*b*, the liquid spray port

205*b* and liquid return port 206*b* may be arranged across components, for example, a part of the liquid inlet channel 203*b* is arranged at the outer stator housing 200-1*b*, another part of the liquid inlet channel 203*b* is arranged at the front stator plate 200-3*b*, a part of the liquid outlet channel 204*b* is arranged at the outer stator housing 200-1*b*, and another part of the liquid outlet channel 204*b* is arranged at the front stator plate 200-3*b*. In the figure, the liquid inlet 201*b*, the liquid outlet 202*b*, the liquid spray port 205*b* and the liquid return port 206*b* are all arranged at the outer stator housing 200-1*b*.

In an embodiment of the present application, the number of the liquid spray port 205*b* is more than one, each of the more than one liquid spray port 205*b* corresponds to a middle part of a corresponding stator unit 101*b* of the stator units 101*b*, or each of the more than one liquid spray port 205*b* corresponds to the third cooling channel. In order to prolong a time period in which the liquid refrigerant stays in the first cooling channel 801*b*, a liquid spray port 205*b* in the present application corresponds to a middle part of a corresponding stator unit 101*b* of the stator units 101*b*, as the liquid refrigerant enters the first cooling channel 801*b* through the liquid spray port 205*b*, the liquid refrigerant, under a relatively high pressure, is first sprayed onto the stator unit 101*b*, and then flows to two sides under the reflection of the stator unit 101*b*, thereby prolonging the time period in which the liquid refrigerant stays in the first cooling channel 801*b* and improving the efficiency of heat dissipation.

The stator core 100*b* is a segmented core or an integral core.

The above embodiments in the specification are described in a progressive manner. Each of the embodiments is mainly focused on the differences from other embodiments, and reference may be made among these embodiments with respect to the same or similar parts.

According to the above description of the disclosed embodiments, those skilled in the art can implement or practice the present application. Various modifications to these embodiments are apparent for those skilled in the art. The general principles defined herein may be implemented in other embodiments without departing from the spirit and scope of the present application. Therefore, the present application should not be limited to the embodiments disclosed herein, but has the widest scope in accordance to the principle and the novel features disclosed herein.

The invention claimed is:

1. A cooling structure for a disc electric motor, comprising:

a stator core having a plurality of stator units;

a stator housing enclosing the stator core, wherein a first cavity is defined by the stator housing and an outer side of the stator core, a second cavity is defined by the stator housing and an inner side of the stator core, wherein the stator housing is provided with a liquid inlet channel, a liquid outlet channel, a liquid inlet, a liquid outlet, a liquid spray port and a liquid return port, wherein the liquid inlet and the liquid spray port are communicated through the liquid inlet channel, and the liquid outlet and the liquid return port are communicated through the liquid outlet channel;

a first baffle and a second baffle arranged between the outer side of the stator core and the stator housing, wherein the first baffle and the second baffle separate the first cavity into a first cooling channel and a second cooling channel, the first cooling channel is communicated with the liquid outlet, and the second cooling channel is communicated with the liquid return port;

a first coil and a second coil arranged on each of the plurality of stator units; and a partitioner interposed between the first coil and the second coil to space the first coil apart from the second coil such as to create a third cooling channel which is formed between the adjacent stator units to communicate the first cavity with the second cavity and is configured to allow liquid refrigerant to directly contact and exchange heat with the first coil, the second coil, the adjacent stator units and the partitioner, wherein first coils on adjacent ones of the stator units are in a close fit with each other, and second coils on the adjacent stator units are in a close fit with each other;

wherein the partitioner comprises a first partitioner and a second partitioner, the first partitioner is arranged at an outer side of the stator unit, and the second partitioner is arranged at an inner side of the stator unit; and wherein the first partitioner has a width smaller than a width of the outer side of the stator unit; and/or wherein the second partitioner has a width smaller than a width of the inner side of the stator unit.

2. The cooling structure for a disc electric motor according to claim 1, wherein the first partitioner is fixed on the first coil and the second coil.

3. The cooling structure for a disc electric motor according to claim 1, wherein the second partitioner is fixed on the first coil and the second coil.

4. The cooling structure for a disc electric motor according to claim 1, wherein the stator housing comprises an outer stator housing, an inner stator housing, a front stator plate and a rear stator plate, the stator core is arranged between the outer stator housing and the inner stator housing, the front stator plate is arranged on a first end face of the outer stator housing, the rear stator plate is arranged on a second end face of the outer stator housing, the first cavity is defined by the outer stator housing, the outer side of the stator core, the front stator plate and the rear stator plate, and the second cavity is defined by the inner stator housing, the inner side of the stator core, the front stator plate and the rear stator plate.

5. The cooling structure for a disc electric motor according to claim 4, wherein one or more of the liquid inlet, the liquid outlet, the liquid spray port and the liquid return port are arranged at the outer stator housing, the inner stator housing, the front stator plate or the rear stator plate.

6. The cooling structure for a disc electric motor according to claim 5, wherein the number of the liquid spray port is more than one, and each of the more than one liquid spray port corresponds to a middle part of a corresponding stator unit of the stator units.

7. The cooling structure for a disc electric motor according to claim 1, wherein the stator core is a segmented core.

* * * * *